ELECTRON DISCHARGE TUBE CIRCUIT ARRANGEMENT

Filed Oct. 18, 1947 2 SHEETS—SHEET 1

Inventor
Ernest Green
By Harry Tunick
Attorney

Nov. 13, 1951 E. GREEN 2,574,868
ELECTRON DISCHARGE TUBE CIRCUIT ARRANGEMENT
Filed Oct. 18, 1947 2 SHEETS—SHEET 2
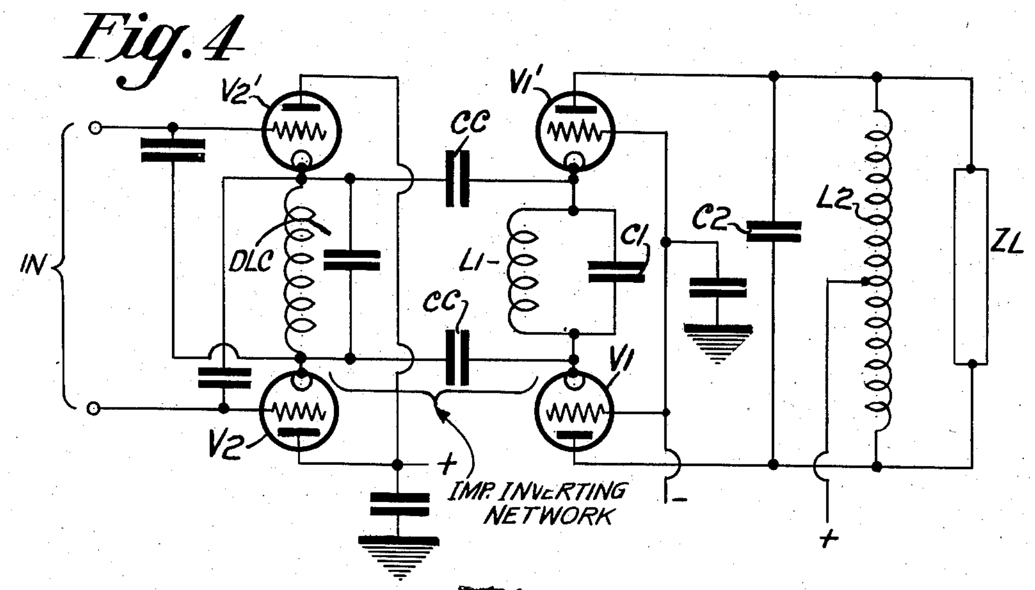
Fig. 4
Fig. 5
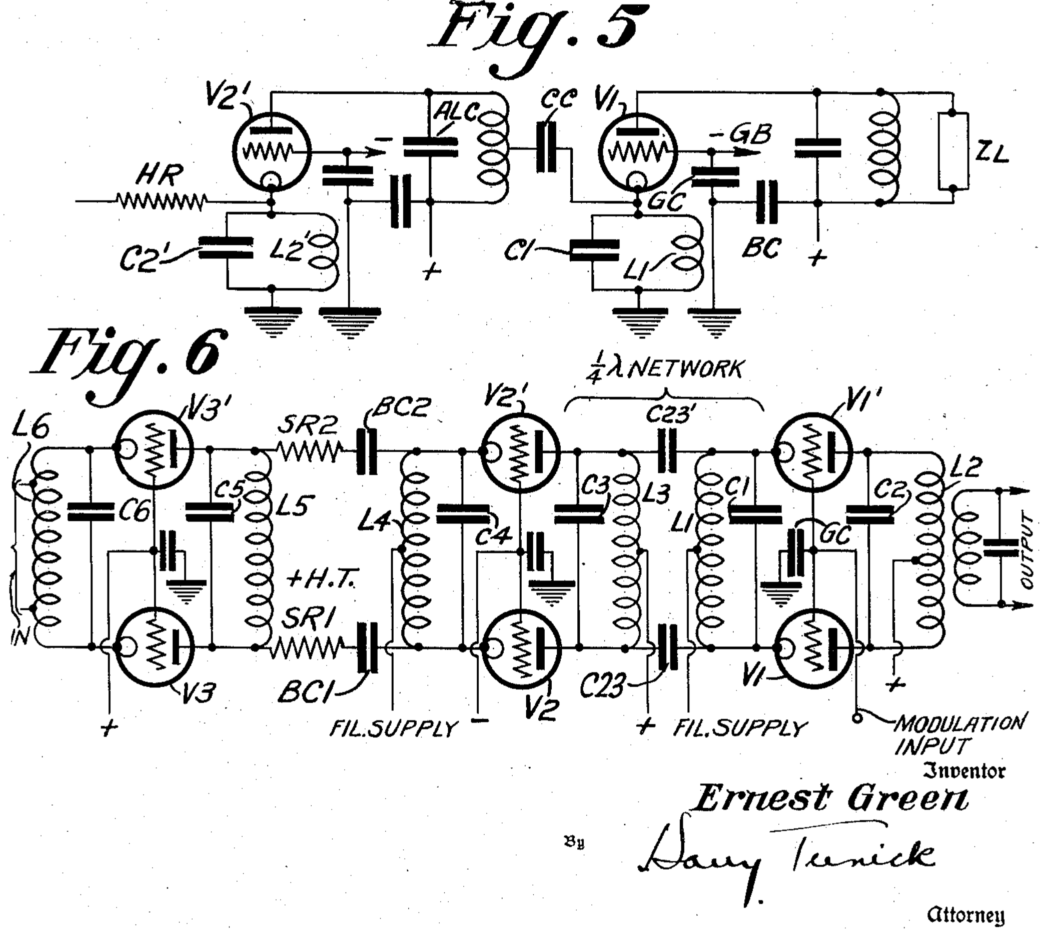
Fig. 6
Inventor
Ernest Green
By Harry Tenick
Attorney Patented Nov. 13, 1951

2,574,868

UNITED STATES PATENT OFFICE 2,574,868

ELECTRON DISCHARGE TUBE CIRCUIT ARRANGEMENT

Ernest Green, Chelmsford, England, assignor to Radio Corporation of America, a corporation of Delaware Application October 18, 1947, Serial No. 780,735
In Great Britain October 18, 1946

2 Claims. (Cl. 179—171)

This invention relates to electron discharge tube circuit arrangements and more specifically to such arrangements employing stages of the so-called grounded grid type.

Triodes are coming into increasingly common use as grounded grid amplifiers, more particularly for high frequency work, mainly because of the relatively great circuit simplicity of the grounded grid type of connection. Known arrangements have the defect, however, that the effective output impedance of the grounded grid stage is often not what is required, for in the usual case in which the driving source for the stage is of very small or negligible impedance, the output impedance approximates the plate resistance of the tube.

The present invention seeks to overcome this defect and to provide improved grounded grid amplifier or the like arrangements wherein a desired effective output impedance can be obtained and, in particular, wherein an effective output impedance which is large relative to the load impedance can be obtained.

According to this invention a grounded grid amplifier or other circuit arrangement comprises a grounded grid stage which is driven by a source whose impedance is of predetermined value chosen in dependence upon the effective output impedance required. Where a variable output impedance is required the driving source may be arranged to be of variable impedance.

The driving source may take any of a variety of forms, e. g. it may be a screen grid tube, pentode, or similar tube or tubes; or it may be constituted by the combination of a low impedance stage with an impedance inverting network which couples said stage to the driven grid stage so as to present a high source impedance to said stage; or it may be constituted by another grounded grid stage with a high input impedance or by a cascaded series of such stages.

Figure 1:
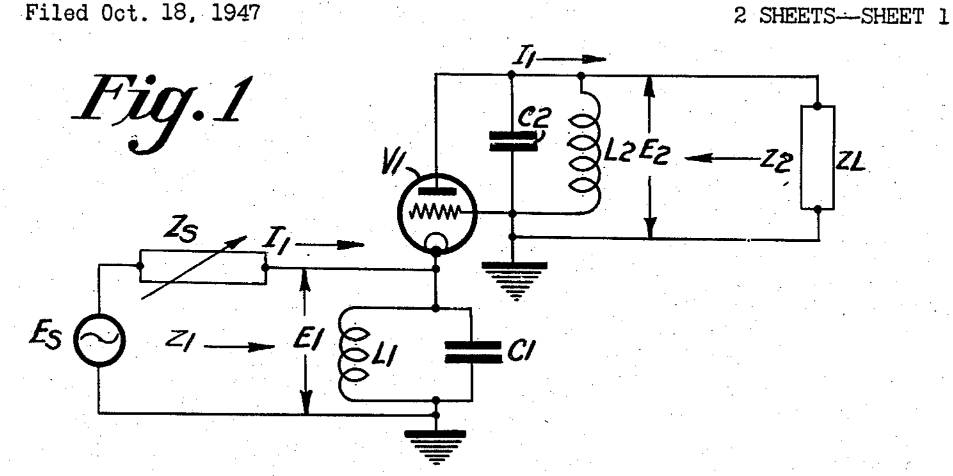

The invention is illustrated in and further explained in connection with the accompanying drawings in which Fig. 1 is an explanatory diagrammatic figure which will be referred to in the mathematical exposition which follows and the remaining figures are diagrams showing embodiments of the invention. Where possible like references are used for like parts throughout the figures.

Referring to Fig. 1, it will first be shown that the effective output impedance of a grounded grid stage (comprising triode V1 in Fig. 1) depends on the impedance of the source driving that stage on the input side and therefore, by making the source impedance high the stage output impedance may be made high. Let:

$I_1$=fundamental component of current, common both to the input circuit and the load.

$Z_L$=load impedance.

$E_2$=output volts from the stage across the tuned circuit L2, C2 and the load $Z_L$.

$E_1$=input volts to the stage across the tuned circuit L1, C1.

$E_s$=internal E. M. F. of the driving source.

$Z_s$=effective impedance of the driving source.

$Z_1$=effective impedance of the input to the stage.

$Z_2$=effective impedance of the output of the stage.

$R_p$=plate resistance of the tube in the stage, and $\mu$=amplification factor of the tube.

Then, for the grounded grid arrangement $$(\mu+1)E_1=(R_p+Z_L)I_1 \qquad (1)$$

so that $$Z_1=\frac{E_1}{I_1}=\frac{R_p+Z_L}{\mu+1} \qquad (2)$$

and for the input side $$E_s=(Z_s+Z_1)I_1=\left(Z_s+\frac{R_pZ_L}{\mu+1}\right)I_1$$

$$(\mu+1)E_s=(R_p+Z_s(\mu+1))I_1+ZI_1 \qquad (3)$$

This is the equation of a generator with internal E. M. F. of $(\mu+1)$ $E_s$ and internal impedance $(R_p+Z_s(\mu+1))$ operating into a load $Z_L$. Thus the effective output impedance $Z_2$ is given by:

$$Z_2=R_p+Z_s(\mu+1) \qquad (4)$$

If, therefore $Z_s$ is negligible or very small (the common case)

$$Z_2=R_p$$

but by making $Z_s$ large $Z_2$ can be made large. For example, by taking a value of 5000 ohms for $Z_s$ for a tube with a value of 50 it is possible to add over 250,000 ohms to the effective output impedance.

Figures 2, 3:
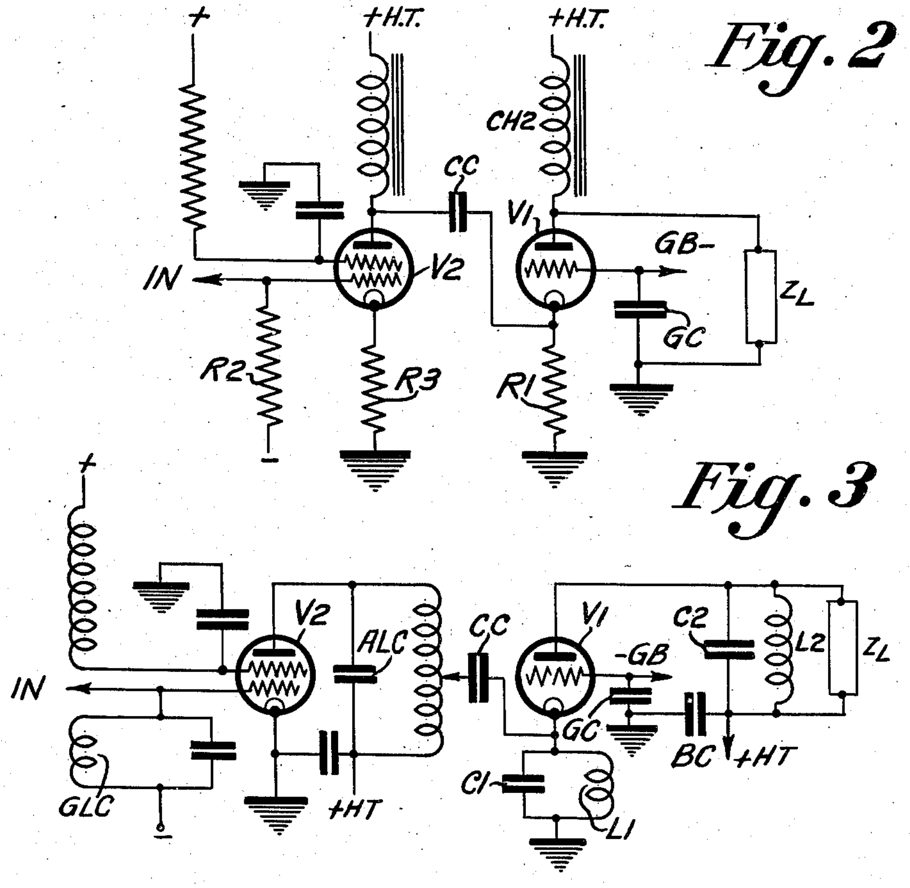

Referring to Fig. 2 which shows one embodiment of the invention suitable for use on low frequency, a grounded grid triode V1 has its cathode connected to earth through a resistance R1 across which input is applied and its grid earthed through a suitable condenser GC and biased from a suitable source (not shown) connected at GB—. Anode potential is applied in any convenient way, e. g. through a choke CH2 and the anode is connected to one end of the load represented by the rectangle $Z_L$ which is earthed at the other end.

In accordance with this invention the driving source of the triode is constituted by a screen grid tube V2 whose anode is condenser coupled by condenser CC to the cathode of the triode V1 and whose cathode is earthed through a resistance R3. The input wave to be amplified is applied at IN across a resistance R2 (or other impedance in the control grid circuit of the screen grid tube) whose electrodes receive operating D. C. poentials in any convenient well known way, for example as conventionally shown.

Fig. 3 shows a modification suitable for use on high frequencies. Here parallel tuned circuits L1, C1 and L2, C2 are connected respectively between the cathode of the grounded grid triode V1 and earth and the anode of said triode and earth, the latter connection including, of course, a blocking condenser BC in the case illustrated in which anode potential is applied to the triode through the coil in the anode tuned circuit. The cathode tuned circuit C1, L1 replaces the cathode leg resistance R1 of Fig. 2. These two tuned circuits serve to tune out, respectively, the output circuit and input circuit capacities. The cathode of the triode V1 is capacity coupled by condenser CC to a point on the anode tuned circuit ALC of a screen grid tube V2 which receives the input wave on its control grid across the usual grid tuned circuit GLC.

As already stated, the driving source for the grounded grid stage may be constituted by a cathode follower coupled to said stage through an impedance inverting network, e. g. a real or artificial line a quarter or an odd multiple of a quarter wave length long.

In the embodiment of Fig. 4 the grounded grid or driven stage consists of two triodes V1, V1' in balanced arrangement with a tuned circuit L1, C1 between their cathodes and another tuned circuit L2, C2 in parallel with the load $Z_L$ between their anodes. The input or driving source consists of two triodes V2, V2' arranged in a balanced cathode follower circuit coupled to the grounded grid triode stage through a load inverting network which includes the tuned circuit L1, C1 and a tuned circuit DLC between the cathodes of the driving stage V2, V2'.

In a further type of embodiment a plurality of generally similar grounded grid tubes in cascade is employed, the cathode of each tube (except the first) being capacity coupled to a suitable point on the tuned anode circuit of the preceding and the first tube having a high input impedance constituted, for example, by a resistance connected to the input cathode. In Fig. 5, which illustrates an embodiment of this type, the grounded grid stage V1 having the tuned circuit L1, C1 in its cathode leg is capacity coupled by condenser CC to a tap on the coil of the anode tuned circuit ALC of a preceding grounded grid stage including triode V2' having a tuned circuit L2', C2' in its cathode leg and a high resistance HR connected to the input cathode.

Although, in the foregoing description, amplifiers operating as so-called class A amplifiers without grid current have been assumed (the preceding mathematical theory fits this case) the invention is also applicable to other cases, i. e. to tubes operating in class B or class C with or without grid current. The main effect of grid current is somewhat to reduce the effective source impedance.

An important application of this invention is to provide a stage having a high effective output impedance in an arrangement wherein such a stage is employed in combination with a load inverting network, e. g. a quarter wave line (that is to say a line one quarter, or an odd multiple of one quarter, of a wave length long electrically), to act as a low impedance source feeding into a varying load. A particular example of this is in connection with a television transmitter using grounded grid amplifiers, with a grid modulation applied to one of the stages. In such a case the load on the stage preceding the modulated stage varies from a heavy load at full output to zero at zero output. Fig. 6 illustrates one embodiment in which the present invention is so applied. Here the grid modulated stage consists of two triodes V1, V1' with tuned circuits C1, L1 and C2, L2 respectively between their cathodes and their anodes, the grids, which are connected to earth through a condenser GC, being connected together and to a source (not shown) of modulation input. The cathode tuned circuit L1, C1 forms part of a quarter wave impedance inverting network which also includes, in addition to a condenser C23 or C23' in each wire thereof, a tuned circuit L3, C3 connected between the anodes of a pair of triodes V2, V2' having grounded grids. This grounded grid stage is arranged in accordance with this invention to present a high effective output impedance by providing the said stage with a high input impedance which is obtained, for example as shown, by coupling the opposite ends of at uned circuit L4, C4 connected between the cathodes of the grounded grid triodes V2, V2' through blocking condensers BC1, BC2 and series resistances SR1, SR2 to the opposite ends of a tuned circuit L5, C5 connected between the anodes of a preceding pair of triodes V3, V3' with grounded grids. High frequency input is applied at IN between suitably chosen points on the inductance of a parallel tuned circuit L6, C6 between the cathodes of the triodes V3, V3'. Since the load here is stabilised by the resistances SR1, SR2 the type of input circuit for the triodes V3, V3' is unimportant.

A similar arrangement to that of the last described embodiment can also be employed if the modulated stage is an ordinary neutralised or screen grid stage imposing a variable load by reason of change of grid current. Indeed, an arrangement in accordance with this invention may be employed as a high impedance source wherever required.

What is claimed is:

1. A grounded grid amplifier comprising a driven grounded grid stage including two triodes in balanced arrangement with a tuned circuit between their cathodes and another tuned circuit in parallel with the load between their anodes, a low-impedance source for driving said stage including two triodes connected in a balanced cathode follower circuit and having a tuned circuit between the two cathodes thereof, and an impedance inverting network coupling said source to said stage, said network including the two tuned circuits between the cathodes of the source and the cathodes of the driven stage respectively.

2. In an amplifier system: an electron discharge device structure having a control grid which is at ground or equivalent potential, said structure also having an anode in an output circuit, and a cathode which is above ground or equivalent potential; a source of electrical energy to be amplified, said source being of low impedance and comprising an electron discharge tube structure having a control grid excited by electrical energy to be amplified, having a cathode and having an anode coupled to a source of direct potential; and an impedance inverting network coupling the last-named cathode to the first-named cathode.

ERNEST GREEN.

REFERENCES CITED

The following references are of record in the file of this patent:

UNITED STATES PATENTS

| Number | Name | Date |
|---|---|---|
| 2,165,844 | Finch | July 11, 1939 |
| 2,205,880 | Finch | June 25, 1940 |
| 2,211,003 | Conklin | Aug. 13, 1940 |
| 2,302,798 | Percival | Nov. 24, 1942 |
| 2,330,109 | Brown | Sept. 21, 1943 |
| 2,393,709 | Romander | Jan. 29, 1946 |
| 2,431,333 | Labin | Nov. 25, 1947 |
| 2,450,445 | Rosencrans | Oct. 5, 1948 |
| 2,463,229 | Wheeler | Mar. 1, 1949 |

FOREIGN PATENTS

| Number | Country | Date |
|---|---|---|
| 861,809 | France | Feb. 18, 1941 |